US011807568B2

(12) United States Patent
Ogasawara et al.

(10) Patent No.: US 11,807,568 B2
(45) Date of Patent: Nov. 7, 2023

(54) INORGANIC COMPOSITION ARTICLE

(71) Applicant: OHARA INC., Kanagawa (JP)

(72) Inventors: Kohei Ogasawara, Kanagawa (JP); Toshitaka Yagi, Kanagawa (JP); Nozomu Oda, Kanagawa (JP)

(73) Assignee: OHARA INC., Kanagawa (JP)

( * ) Notice: Subject to any disclaimer, the term of this patent is extended or adjusted under 35 U.S.C. 154(b) by 0 days.

(21) Appl. No.: 17/436,612

(22) PCT Filed: Mar. 5, 2020

(86) PCT No.: PCT/JP2020/009459
§ 371 (c)(1),
(2) Date: Sep. 6, 2021

(87) PCT Pub. No.: WO2020/179872
PCT Pub. Date: Sep. 10, 2020

(65) Prior Publication Data
US 2022/0144691 A1  May 12, 2022

(30) Foreign Application Priority Data

Mar. 6, 2019 (JP) ................................. 2019-040205
Mar. 6, 2019 (JP) ................................. 2019-040206

(51) Int. Cl.
*C03C 10/00* (2006.01)
*C03B 27/03* (2006.01)
*C03C 21/00* (2006.01)

(52) U.S. Cl.
CPC .......... *C03C 10/0027* (2013.01); *C03B 27/03* (2013.01); *C03C 21/002* (2013.01); *C03C 2204/00* (2013.01)

(58) Field of Classification Search
CPC ................. C03C 10/0027; C03C 10/0018
See application file for complete search history.

(56) References Cited

U.S. PATENT DOCUMENTS

| | | | |
|---|---|---|---|
| 6,426,311 B1* | 7/2002 | Goto | .................... G11B 5/82 |
| 2002/0115550 A1 | 8/2002 | Kawai et al. | |
| 2011/0136651 A1 | 6/2011 | Yagi et al. | |
| 2015/0099124 A1 | 4/2015 | Beunet et al. | |
| 2016/0060159 A1 | 3/2016 | Kim et al. | |
| 2019/0161395 A1* | 5/2019 | Beall | .................... C03C 4/18 |
| 2019/0256407 A1 | 8/2019 | Beall et al. | |
| 2022/0144691 A1 | 5/2022 | Ogasawara et al. | |

FOREIGN PATENT DOCUMENTS

| | | | | |
|---|---|---|---|---|
| CN | 1283596 A | | 2/2001 | |
| CN | 1306946 A | * | 8/2001 | ......... C03C 10/0027 |
| CN | 101279818 A | | 10/2008 | |
| CN | 101462829 A | | 6/2009 | |
| CN | 109320091 A | | 2/2019 | |
| JP | 200148584 A | | 2/2001 | |
| JP | 200297037 A | | 4/2002 | |
| JP | 2002203309 A | | 7/2002 | |
| JP | 2008254984 A | | 10/2008 | |
| JP | 201256786 A | | 3/2012 | |
| TW | 201527240 A | | 7/2015 | |
| WO | WO2017205596 A1 | | 11/2017 | |

OTHER PUBLICATIONS

CN-1306946—A machine translation (Year: 2001).*
Office Action dated Jan. 24, 2022 for CN application No. 202080018582.X.
WIPO, International Search Report dated Sep. 10, 2020.
Search Report dated Nov. 7, 2022 for EP application No. 20766160.4.

* cited by examiner

*Primary Examiner* — Karl E Group
*Assistant Examiner* — Cameron K Miller
(74) *Attorney, Agent, or Firm* — Li & Cai Intellectual Property Office

(57) ABSTRACT

To provide an inorganic composition article containing at least one kind selected from α-cristobalite and α-cristobalite solid solution as a main crystal phase, in which by mass % in terms of oxide, a content of a $SiO_2$ component is 50.0% to 75.0%, a content of a $Li_2O$ component is 3.0% to 10.0%, a content of an $Al_2O_3$ component is 5.0% or more and less than 15.0%, and a total content of the $Al_2O_3$ component and a $ZrO_2$ component is 10.0% or more, and a surface compressive stress value is 600 MPa or more.

7 Claims, No Drawings

INORGANIC COMPOSITION ARTICLE

FIELD OF THE DISCLOSURE

The present disclosure relates to an inorganic composition article having a hard surface and relates to crystallized glass.

BACKGROUND OF THE DISCLOSURE

It is expected that various types of inorganic materials will be used as a cover glass or a housing for protecting a display of a portable electronic device such as a smartphone or a tablet PC, a protector for protecting a lens of an in-vehicle optical device, an interior bezel, a console panel, a touch panel material, a smart key, and the like. These devices are required to be used in a harsher environment than an environment required for a hard disk substrate, and there is an increasing demand for an inorganic material having a higher hardness.

There is crystallized glass obtained by increasing the strength of glass. The crystallized glass is obtained by precipitating crystals inside of the glass, and is known to have superior mechanical strength to amorphous glass.

Conventionally, a known method for increasing the strength of glass includes chemical strengthening. When an alkaline component existing in a surface layer of glass is subject to exchange reaction with an alkaline component with a larger ionic radius to form a compressive stress layer on the surface, it is possible to suppress the growth of cracks and increase the mechanical strength. To do this, it is necessary to obtain a sufficiently high compressive stress value.

Patent Document 1 discloses an inorganic composition article for an information recording medium that can be chemically strengthened. Patent Document 1 states that an α-cristobalite-based inorganic composition article may be chemically strengthened and may be used as a high-strength material substrate. However, crystallized glass for an information recording medium represented by a substrate for a hard disk is not intended for use in a harsh environment, and the surface compressive stress value associated with chemical strengthening has not been discussed.

PRIOR ART DOCUMENT

Patent Document

[Patent Document 1] Japanese Unexamined Patent Application Publication No. 2008-254984

SUMMARY OF THE DISCLOSURE

An object of the present disclosure is to provide an inorganic composition article having a high surface hardness and to provide crystallized glass.

The present disclosure provides the following.
(Configuration 1)
An inorganic composition article containing at least one kind selected from α-cristobalite and α-cristobalite solid solution as a main crystal phase, wherein
by mass % in terms of oxide,
a content of a $SiO_2$ component is 50.0% to 75.0%,
a content of a $Li_2O$ component is 3.0% to 10.0%,
a content of an $Al_2O_3$ component is 5.0% or more and less than 15.0%, and
a total content of the $Al_2O_3$ component and a $ZrO_2$ component is 10.0% or more, and
a surface compressive stress value is 600 MPa or more.
(Configuration 2)
The inorganic composition article according to Configuration 1, wherein by mass % in terms of oxide,
a content of a $ZrO_2$ component is more than 0% and 10.0% or less,
a content of a $K_2O$ component is 0% to 10.0%, and
a content of a $P_2O_5$ component is 0% to 10.0%.
(Configuration 3)
The inorganic composition article according to Configuration 1 or 2, wherein by mass % in terms of oxide,
a content of a $Na_2O$ component is 0% to 10.0%,
a content of a MgO component is 0% to 10.0%,
a content of a CaO component is 0% to 10.0%,
a content of a SrO component is 0% to 10.0%,
a content of a BaO component is 0% to 10.0%,
a content of a ZnO component is 0% to 10.0%, and
a content of a $Sb_2O_3$ component is 0% to 3.0%.
(Configuration 4)
The inorganic composition article according to any one of Configurations 1 to 3, wherein by mass % in terms of oxide,
a content of a $Nb_2O_5$ component is 0% to 10.0%,
a content of a $Ta_2O_5$ component is 0% to 10.0%, and
a content of a $TiO_2$ component is 0% or more and less than 7.0%.
(Configuration 5)
A crystallized glass containing at least one kind selected from α-cristobalite and α-cristobalite solid solution as a main crystal phase, wherein
by mass % in terms of oxide,
a content of a $SiO_2$ component is 50.0% to 75.0%,
a content of a $Li_2O$ component is 3.0% to 10.0%,
a content of an $Al_2O_3$ component is 5.0% or more and less than 15.0%,
a content of a $ZrO_2$ component is more than 0% and 10.0% or less, and
a total content of the $Al_2O_3$ component and the $ZrO_2$ component is 10.0% or more.
(Configuration 6)
The crystallized glass according to Configuration 5, wherein by mass % in terms of oxide,
a content of a $K_2O$ component is 0% to 5.0%, and
a content of a $P_2O_5$ component is 0% to 10.0%.
(Configuration 7)
The crystallized glass according to Configuration 5 or 6, wherein by mass % in terms of oxide,
a content of a $Na_2O$ component is 0% to 4.0%,
a content of a MgO component is 0% to 4.0%,
a content of a CaO component is 0% to 4.0%,
a content of a SrO component is 0% to 4.0%,
a content of a BaO component is 0% to 5.0%,
a content of a ZnO component is 0% to 10.0%, and
a content of a $Sb_2O_3$ component is 0% to 3.0%.
(Configuration 8)
The crystallized glass according to any one of Configurations 5 to 7, wherein by mass % in terms of oxide,
a content of a $Nb_2O_5$ component is 0% to 5.0%,
a content of a $Ta_2O_5$ component is 0% to 6.0%, and
a content of a $TiO_2$ component is 0% or more and less than 1.0%.

According to the present disclosure, it is possible to provide an inorganic composition article having a high surface hardness and crystallized glass.

The inorganic composition article and the crystallized glass according to the present disclosure may be used for a protective member for a device or the like by taking advantage of the feature of being an inorganic material having high strength. The inorganic composition article and the crystallized glass according to the present disclosure may be used as a cover glass or a housing of a smartphone, a member of a portable electronic device such as a tablet PC and a wearable terminal, and a member such as a protective protector or a substrate for a head-up display, or the like used in a transport aircraft such as a vehicle and an airplane. The inorganic composition article and the crystallized glass according to the present disclosure may be used for other electronic devices and machinery, a building member, a member for a solar panel, a member for a projector, and a cover glass (windshield) for eyeglasses and a watch, for example.

DETAILED DESCRIPTION OF THE EXEMPLARY EMBODIMENTS

Embodiments and examples of an inorganic composition article according to the present disclosure will be described below in detail, but the present disclosure is not limited to the following embodiments and examples, and may be implemented with appropriate changes within the scope of the object of the present disclosure.

The inorganic composition article according to the present disclosure is an inorganic composition article containing at least one kind selected from α-cristobalite and α-cristobalite solid solution as a main crystal phase, in which by mass % in terms of oxide, a content of a $SiO_2$ component is 50.0% to 75.0%, a content of a $Li_2O$ component is 3.0% to 10.0%, a content of an $Al_2O_3$ component is 5.0% or more and less than 15.0%, and a total content of the $Al_2O_3$ component and a $ZrO_2$ component is 10.0% or more, and a surface compressive stress value is 600 MPa or more.

When the inorganic composition article has the above main crystal phase, composition, and compressive stress value, it is possible to provide a hard inorganic composition article.

The "inorganic composition article" in the present disclosure is composed of inorganic composition materials such as glass, crystallized glass, ceramics, or a composite material thereof. For example, an article obtained by shaping these inorganic materials into a desired shape by processing or synthesis through a chemical reaction corresponds to the article according to the present disclosure. A green compact obtained by crushing the inorganic materials and then pressurizing the same, and a sintered body obtained by sintering the green compact, for example, also corresponds to the article according to the present disclosure. The shape of the article obtained here is not limited in smoothness, curvature, size, and the like. Examples of the shape include a plate-shaped substrate, a shaped body with a curvature, and a three-dimensional structure having a complicated shape.

The crystallized glass according to the present disclosure is crystallized glass containing at least one kind selected from α-cristobalite and α-cristobalite solid solution as a main crystal phase, in which by mass % in terms of oxide, a content of a $SiO_2$ component is 50.0% to 75.0%, a content of a $Li_2O$ component is 3.0% to 10.0%, a content of an $Al_2O_3$ component is 5.0% or more and less than 15.0%, a content of a $ZrO_2$ component is more than 0% and 10.0% or less, and a total content of the $Al_2O_3$ component and the $ZrO_2$ component is 10.0% or more.

When the crystallized glass has the above main crystal phase and composition, it is possible to provide a hard crystallized glass having high compressive stress value on the surface.

Crystallized glass is also called glass-ceramics, and is a material obtained by subjecting glass to heat treatment to precipitate crystals inside the glass. The crystallized glass is a material having a crystalline phase and a glass phase, and is distinguished from an amorphous solid. Generally, the crystal phase of the crystallized glass is determined by using a peak angle appearing in an X-ray diffraction pattern of X-ray diffraction analysis.

The inorganic composition article and the crystallized glass according to the present disclosure (hereinafter, also simply referred to as "inorganic composition article") will be described below. The inorganic composition article is preferably strengthened crystallized glass.

The inorganic composition article contains one or more kinds selected from α-cristobalite and α-cristobalite solid solution as the main crystal phase. The inorganic composition article that precipitates these crystalline phases has high mechanical strength.

Here, the "main crystal phase" as used herein corresponds to a crystal phase contained in the largest amount in the inorganic composition article determined from the peak of the X-ray diffraction pattern.

As used herein, all the contents of each component are expressed by mass % in terms of oxide unless otherwise specified. Here, "in terms of oxide" means that, if it is assumed that all the constitutional components of the inorganic composition article are decomposed into oxides, when the total mass of the oxides is 100% by mass, the amount of the oxide of each component contained in the inorganic composition article is expressed in mass %. As used herein, "A % to B %" represents A % or more and B % or less.

A $SiO_2$ component is an essential component necessary for constituting one or more kinds selected from α-cristobalite and α-cristobalite solid solution. Preferably, the upper limit of the $SiO_2$ component is 75.0% or less, less than 74.0%, less than 73.7%, less than 72.5%, or less than 72.0%. Preferably, the lower limit thereof is 50.0% or more, 55.0% or more, 58.0% or more, 60.0% or more, 62.0% or more, or 64.0% or more.

A $Li_2O$ component is an important component for improving the meltability of a raw inorganic composition, and if the amount of the $Li_2O$ component is less than 3.0%, it is not possible to obtain the above effect and thus, it is difficult to melt raw glass, and if the amount exceeds 10.0%, an amount of lithium disilicate crystals to be produced increases.

Preferably, the lower limit of the $Li_2O$ component is 3.0% or more, 3.5% or more, 4.0% or more, 4.5% or more, 5.0% or more, or 5.5% or more. Preferably, the upper limit thereof is 10.0% or less, 9.0% or less, 8.5% or less, or 8.0% or less.

An $Al_2O_3$ component is a component suitable for improving the mechanical strength of the inorganic composition article. Preferably, the upper limit of the $Al_2O_3$ component is less than 15.0%, 14.5% or less, 14.0% or less, 13.5% or less, or 13.0% or less. Preferably, the lower limit thereof is 5.0% or more, 5.5% or more, 5.8% or more, 6.0% or more, or 6.5% or more.

A $ZrO_2$ component is an optional component to be added to improve the mechanical strength. Preferably, the upper limit of the $ZrO_2$ component is 10.0% or less, 9.5% or less, 9.0% or less, 8.8% or less, or 8.5% or less. Preferably, the lower limit thereof is more than 0%, 0.1% or more, 1.0% or more, 1.5% or more, 1.8% or more, or 2.0% or more.

If [$Al_2O_3+ZrO_2$], which is the sum of the contents of the $Al_2O_3$ component and the $ZrO_2$ component, is large in amount, the compressive stress on the surface increases when chemical strengthening, heat treatment strengthening, or ion implantation strengthening is performed. Preferably, the lower limit of [$Al_2O_3+ZrO_2$] is 10.0% or more, 10.5% or more, 11.0% or more, 12.0% or more, 13.0% or more, or more than 13.5%.

On the other hand, preferably, the upper limit of [$Al_2O_3+ZrO_2$] is 22.0% or less, 21.0% or less, 20.0% or less, or 19.0% or less.

The lower limit of the total contents of the $SiO_2$ component, the $Li_2O$ component, the $Al_2O_3$ component, and the $ZrO_2$ component may be 75.0% or more, 80.0% or more, 83.0% or more, or 85.0% or more.

A $P_2O_5$ component is an optional component to be added to act as a crystal nucleation agent for the inorganic composition. Preferably, the upper limit of the $P_2O_5$ component is 10.0% or less, 9.0% or less, 8.0% or less, or 7.5% or less. Preferably, the lower limit thereof may be 0% or more, 0.5% or more, 1.0% or more, or 1.5% or more.

A $K_2O$ component is an optional component to be added to improve the surface compressive stress. Preferably, the lower limit of the $K_2O$ component may be 0% or more, 0.1% or more, 0.3% or more, 0.5% or more, or 0.8% or more.

If the $K_2O$ component is contained in an excessive amount, it may be difficult to precipitate crystals. Therefore, preferably, the upper limit thereof may be 10.0% or less, 6.0% or less, 5.0% or less, 4.0% or less, 3.5%, or 3.0% or less.

A $Na_2O$ component is an optional component to be added to improve the surface compressive stress. If the $Na_2O$ component is contained in an excessive amount, it may be difficult to obtain a desired crystal phase. Preferably, the upper limit of the $Na_2O$ component may be 10.0% or less, 5.0% or less, 4.0% or less, 3.0% or less, or 2.5% or less.

MgO, CaO, SrO, BaO, and ZnO components are optional components and improve the meltability of the inorganic composition, but if these components are contained in an excessive amount, the obtained crystals tend to be coarsened. Therefore, preferably, the upper limit of the MgO component is 10.0% or less, 7.0% or less, 5.0% or less, 4.0% or less, 3.0% or less, or 2.5% or less. Preferably, the upper limit of the CaO component may be 10.0% or less, 7.0% or less, 5.0% or less, 4.0% or less, 3.0% or less, or 2.0% or less. Preferably, the upper limit of the SrO component may be 10.0% or less, 7.0% or less, 4.0% or less, 3.0% or less, 2.5% or less, or 2.3% or less. Preferably, the upper limit of the BaO component is 10.0% or less, 8.0% or less, 7.0% or less, 6.0% or less, 5.0% or less, or 4.0% or less. Preferably, the upper limit of the ZnO component may be 10.0% or less, 9.0% or less, 8.8% or less, 8.5% or less, 8.0% or less, or 7.5% or less.

The total amount of the SrO and BaO components is preferably less than 12.0%. More preferably, the upper limit thereof may be less than 10.0%, less than 8.0%, less than 6.0%, or less than 4.5%.

As long as the effects of the present disclosure are not impaired, the inorganic composition article may or may not contain each of a $Nb_2O_5$ component, a $Ta_2O_5$ component, and a $TiO_2$ component. Preferably, the upper limit of the $Nb_2O_5$ component may be 10.0% or less, 6.0% or less, 5.0%, or 3.0%. Preferably, the upper limit of the $Ta_2O_5$ component may be 10.0% or less, 8.0%, 6.0%, or 4.0% or less. Preferably, the upper limit of the $TiO_2$ component may be less than 7.0%, 5.0% or less, 3.0% or less, 2.0% or less, less than 1.0%, 0.5% or less, or 0.1% or less.

As long as the effect of the present disclosure is not impaired, the inorganic composition article may or may not contain each of a $B_2O_3$ component, a $La_2O_3$ component, a $Y_2O_3$ component, a $WO_3$ component, a $TeO_2$ component, and a $Bi_2O_3$ component. The blending amount of each of the components may be 0% to 2.0%, 0% or more and less than 2.0%, or 0% to 1.0%.

As long as the characteristics of the inorganic composition article according to the present disclosure is not impaired, the inorganic composition article may or may not contain other components not described above. Examples of the other components include metal components (including metal oxides thereof) such as Gd, Yb, Lu, V, Cr, Mn, Fe, Co, Ni, Cu, Ag, and Mo.

A $Sb_2O_3$ component may be contained as a glass clarifying agent. The upper limit thereof may be preferably 3.0% or less, more preferably 1.0% or less, still more preferably 0.6% or less.

The inorganic composition article may or may not include a $SnO_2$ component, a $CeO_2$ component, an $As_2O_3$ component, and one or more kinds selected from the group of F, NOx, and SOx, in addition to the $Sb_2O_3$ component, as the glass clarifying agent. It is noted that the upper limit of the content of the clarifying agent is preferably 3.0% or less, more preferably 1.0% or less, and most preferably 0.6% or less.

On the other hand, there is a tendency to refrain from using each component of Pb, Th, Tl, Os, Be, Cl, and Se, which are considered in recent years as harmful chemical substances, and therefore, preferably, these components are not substantially contained.

On the surface of the inorganic composition article according to the present disclosure, a compressive stress layer having a compressive stress value CS (MPa) of 600 MPa or more is formed. On the surface of the crystallized glass according to the present disclosure, a compressive stress layer may be formed. The compressive stress value of the compressive stress layer is preferably 600 MPa or more, more preferably 650 MPa or more, still more preferably 680 MPa or more, and particularly preferably 700 MPa or more. The upper limit thereof is, for example, 1400 MPa or less, 1300 MPa or less, 1200 MPa or less, or 1100 MPa or less. If the compressive stress layer has such a compressive stress value, the growth of cracks is suppressed and the mechanical strength increases.

The thickness of the compressive stress layer DOLzero (μm) is not limited because it depends on the thickness of the inorganic composition article. For example, in a case of a crystallized glass substrate having a thickness of 10 mm, the lower limit of the thickness of the compressive stress layer may be 1 μm or more, 30 μm or more, 50 μm or more, 70 μm or more, 100 μm or more, 130 μm or more, 150 μm or more, 180 μm or more, or 200 μm or more.

For example, when the inorganic composition article is a crystallized glass substrate, this article can be produced by the following method. That is, raw materials are uniformly mixed so that the above components satisfy a predetermined content range, and melted and shaped to produce raw glass. Next, the raw glass is crystallized to produce crystallized glass.

The raw glass may be treated by heat for precipitation of crystals at a one-stage temperature or a two-stage temperature.

In the two-stage heat treatment, in a nucleation step, the raw glass is firstly applied to heat treatment at a first temperature, and after the nucleation step, in a crystal growth step, the raw glass is applied to heat treatment at a second temperature higher than that in the nucleation step.

The first temperature of the two-stage heat treatment may be preferably 450° C. to 750° C., more preferably 500° C. to 720° C., and still more preferably 550° C. to 680° C. A retention time at the first temperature is preferably 30 minutes to 2000 minutes, and more preferably 180 minutes to 1440 minutes.

The second temperature of the two-stage heat treatment is preferably 600° C. to 800° C., more preferably 650° C. to 750° C. A retention time at the second temperature is preferably 30 minutes to 600 minutes, and more preferably 60 minutes to 400 minutes.

In the one-stage heat treatment, the nucleation step and the crystal growth step are continuously performed at the one-stage temperature. Typically, the temperature is raised to a predetermined heat treatment temperature, is maintained for a certain period of time after reaching the predetermined heat treatment temperature, and is then lowered.

When the heat treatment is performed at the one-stage temperature, the heat treatment temperature is preferably 600° C. to 800° C., and more preferably 630° C. to 770° C. A retention time at the heat treatment temperature is preferably 30 minutes to 500 minutes, and more preferably 60 minutes to 400 minutes.

From the crystallized glass, it is possible to produce a glass shaped body by using, for example, grinding and polishing means. It is possible to produce the crystallized glass substrate by processing the glass shaped body into a thin plate.

An example of a method for forming the compressive stress layer of the inorganic composition article and a method for forming a compressive stress layer in crystallized glass having no compressive stress layer includes a chemical strengthening method in which an alkaline component existing in a surface layer of the crystallized glass substrate is subject to exchange reaction with an alkaline component with a larger ionic radius to form a compressive stress layer on the surface layer. Other examples include a heat strengthening method in which the crystallized glass substrate is heated, and then is quenched, and an ion implantation method in which ions are implanted into the surface layer of the crystallized glass substrate.

The chemical strengthening method may be implemented according to the following steps, for example. A crystallized glass base material is contacted to or immersed in a molten salt of a salt containing potassium or sodium, for example, potassium nitrate ($KNO_3$), sodium nitrate ($NaNO_3$) or a mixed salt or a complex salt thereof. The treatment of contacting or immersing the crystallized glass base material to and in the molten salt (chemical strengthening treatment) may be performed in one stage or in two stages.

For example, in the case of the two-stage chemical strengthening treatment, firstly, the crystallized glass base material is contacted to or immersed in a sodium salt or a mixed salt of potassium and sodium heated at 350° C. to 550° C. for 1 to 1440 minutes, preferably 90 to 500 minutes. Subsequently, secondly, the resultant crystallized glass base material is contacted to or immersed in a potassium salt or a mixed salt of potassium and sodium heated at 350° C. to 550° C. for 1 to 1440 minutes, preferably 60 to 600 minutes.

In the case of the one-stage chemical strengthening treatment, the crystallized glass base material is contacted to or immersed in a salt containing potassium or sodium heated at 350° C. to 550° C. or a mixed salt thereof for 1 to 1440 minutes.

The chemical strengthening of the inorganic composition article may be performed in one stage or in multiple stages, but in order to efficiently increase the surface compressive stress and increase the thickness of the compressive stress layer, it is preferable to perform the two-stage strengthening treatment in which strengthening with a molten salt of sodium is firstly performed and then strengthening with a molten salt of potassium is secondly performed.

The heat strengthening method is not particularly limited, but, for example, the inorganic composition article base material may be heated to 300° C. to 600° C., and thereafter, be applied to rapid cooling such as water cooling and/or air cooling to form the compressive stress layer by a temperature difference between the surface and the inside of the glass substrate. It is noted that when the heat strengthening method is combined with the above chemical treatment method, it is possible to effectively form the compressive stress layer.

The ion implantation method is not particularly limited, but, for example, an arbitrary ion may be collided on the surface of the inorganic composition article base material with an acceleration energy and an acceleration voltage that would not destroy the surface of the base material to implant the ions into the surface of the base metal. Thereafter, when heat treatment is applied to the resultant surface of the base material as necessary, it is possible to form the compressive stress layer on the surface in much the same manner as in the other methods.

EXAMPLES

Examples 1 to 28 and Comparative Examples 1 and 2

Raw materials such as oxides, hydroxides, carbonates, nitrates, fluorides, chlorides, and metaphosphate compounds corresponding to a raw material of each component of the crystallized glass were selected, and the selected raw materials were weighed and mixed uniformly to have the compositions described in Tables 1 to 3.

Next, the mixed raw materials were injected into a platinum crucible and melted in an electric furnace at 1300° C. to 1600° C. for 2 to 24 hours depending on the difficulty of melting the glass composition. Subsequently, the molten glass was stirred and homogenized, cast into the mold after the temperature was lowered to 1000° C. to 1450° C., and the casted glass was cooled slowly to prepare raw glass. In Examples 1 to 24 and Comparative Examples 1 and 2, the obtained raw glass was crystallized by the two-stage heat treatment to prepare crystallized glass. In the first stage, nucleation was performed at the temperatures and for the time periods shown in "Nucleation Conditions" in Tables 1 to 3, and in the second stage, crystallization was performed at the temperature and for the time periods shown in "Crystallization Conditions" in Tables 1 to 3. In Examples 25 to 28, the raw glass was crystallized by the one-stage heat treatment to prepare the crystallized glass. Nucleation and crystallization were performed at the temperatures and for the time periods shown in "Crystallization conditions" in Table 3.

The crystal phases of the crystallized glasses of the Examples 1 to 28 and the Comparative Examples 1 and 2 were determined from an angle of a peak appearing in the X-ray diffraction pattern using an X-ray diffraction analyzer (D8 Discover manufactured by Bruker). When the X-ray diffraction patterns of the crystallized glasses of the Examples 1 to 28 and the Comparative Examples 1 and 2 were seen, all the main peaks (peaks with the highest intensity and the largest peak area) were observed at positions corresponding to the peak pattern of α-cristobalite and/or α-cristobalite solid solution, and thus, it was determined that all the α-cristobalite and the α-cristobalite solid solution were precipitated as the main crystal phase.

The produced crystallized glass was cut and ground, and the opposing sides of the resultant crystallized glass was further polished in parallel to achieve a thickness of 10 mm to obtain a crystallized glass substrate. Next, in the Examples 1 to 23, 25, and 26, a chemically strengthened crystallized glass substrate was obtained by applying the two-stage strengthening to the crystallized glass substrate serving as a base material. Specifically, the crystallized glass substrate was immersed in the $NaNO_3$ molten salt at the temperatures and for the time periods shown in Tables 1 to 3 (first stage), and thereafter, the resultant crystallized glass substrate was immersed in the $KNO_3$ molten salt at the temperatures and for the time periods shown in Tables 1 to 3 (second stage). The substrates obtained in the Example 24 and the Comparative Examples 1 and 2 were subject to the one-stage strengthening through immersion in $KNO_3$ molten salt at the temperatures and for the time periods shown in Table 3. The strengthened substrates of the Comparative Examples 1 and 2 are chemically strengthened crystallized glass substrates corresponding to Examples 25 and 27 described in Patent Document 1. The substrates obtained in the Examples 27 and 28 were subject to the one-stage strengthening through immersion in the $NaNO_3$ molten salt at the temperatures and for the time periods shown in Table 3.

The compressive stress value (CS) on the surface of the strengthened crystallized glass thus obtained was measured. In the Examples 1 to 26 and the Comparative Examples 1 and 2, the compressive stress value was measured by using a glass surface stress meter FSM-6000LE series manufactured by Orihara Manufacturing Co., LTD, and in the Examples 27 and 28, the compressive stress value was measured by using a scattered light photoelastic stress meter SLP-1000. As shown in Tables 1 to 3, in the FSM-6000LE series, in measuring the compressive stress value, the light source of the stress meter was selected between a wavelength of 596 nm and 365 nm according to the strengthening depth. In the SLP-1000, the compressive stress value was measured by using a light source having a wavelength of 640 nm.

The values shown in Tables 1 to 3 were employed for values of the refractive index, which are the CS measurement conditions. The value of the refractive index of the wavelength (640 nm, 596 nm, or 365 nm) of the light source used for the measurement was employed for the refractive index employed for the CS measurement. It is noted that the value of the refractive index at a predetermined wavelength was calculated by using a quadratic approximation expression from the measured values of the refractive index at the wavelengths of a C-line, a d-line, an F-line, and a g-line according to the V-block method specified in JIS B 7071-2: 2018.

The values shown in Tables 1 to 3 were employed for the values of the photoelastic constants, which are the CS measurement conditions. The value of the photoelastic constant of the wavelength (640 nm, 596 nm, or 365 nm) of the light source used for the measurement was employed for the photoelastic constant employed for the CS measurement. It is noted that the photoelastic constants at wavelengths of 640 nm, 596 nm, or 365 nm were calculated by using a quadratic approximation expression from the measured values of the photoelastic constants at a wavelength of 435.8 nm, a wavelength of 546.1 nm, and a wavelength of 643.9 nm.

In a method of measuring the photoelastic constant (β), the opposing sides of a sample shape was polished to form a disk with a diameter of 25 mm and a thickness of 8 mm, a compressive load was applied to the disk in a predetermined direction, the optical path difference occurring in the center of the glass was measured, and the relational expression of $\delta = \beta \cdot d \cdot F$ was used. In the above expression, δ (nm) denotes the optical path difference, d (cm) denotes the glass thickness, and F (MPa) denotes the stress.

In the measurement of the depth DOLzero (μm) (also called stress depth) when the compressive stress of the compressive stress layer is 0 MPa, the sensitivity of the device differs depending on the depth of DOLzero (μm), and thus, the measurement device was selected depending on the depth.

In measuring the depth of the Examples 1 to 23 and 25 to 28, a scattered light photoelastic stress meter SLP-1000 was used, and for the Example 24 and the Comparative Examples 1 and 2, a glass surface stress meter FSM-6000LE series manufactured by Orihara Manufacturing Co., LTD was used for measurement. The wavelength of the measurement light source, the refractive index of the sample, and the photoelastic constant were calculated by using the values shown in Tables. It is noted that when DOLzero (μm) exceeds 500 μm, the depth cannot be measured by the above measuring device, and thus, >500 was stated in Table.

The results are shown in Tables 1 to 3. From Tables 1 to 3, it is seen that the inorganic composition article (crystallized glass) according to the present disclosure has a compressive stress layer having a high CS on the surface, and thus, the surface is hard.

TABLE 1

| Composition (mass %) | Ex. 1 | Ex. 2 | Ex. 3 | Ex. 4 | Ex. 5 |
|---|---|---|---|---|---|
| $SiO_2$ | 68.50 | 66.80 | 65.70 | 65.57 | 66.80 |
| $Li_2O$ | 7.00 | 7.00 | 7.00 | 6.80 | 6.00 |
| $Na_2O$ | | | | | 2.00 |
| $K_2O$ | 2.00 | 2.00 | 2.00 | 1.40 | 1.00 |
| $Al_2O_3$ | 7.50 | 7.50 | 7.50 | 7.20 | 7.50 |
| $P_2O_5$ | 2.00 | 2.00 | 2.00 | 2.00 | 2.00 |
| MgO | 0.70 | 0.40 | 0.50 | 0.25 | 0.40 |
| CaO | | | | | |
| SrO | | | | | |
| BaO | 0.72 | 0.72 | 0.72 | 3.40 | 0.72 |
| ZnO | 6.50 | 6.50 | 6.50 | 6.40 | 6.50 |

TABLE 1-continued

| Composition (mass %) | | | | | | | |
|---|---|---|---|---|---|---|---|
| $ZrO_2$ | | | 5.00 | 5.00 | 5.00 | 4.90 | 5.00 |
| $Nb_2O_5$ | | | | 2.00 | | 2.00 | 2.00 |
| $TiO_2$ | | | | | | | |
| $Ta_2O_5$ | | | | | 3.00 | | |
| $Sb_2O_3$ | | | 0.08 | 0.08 | 0.08 | 0.08 | 0.08 |
| Total | | | 100.0 | 100.0 | 100.0 | 100.0 | 100.0 |
| $Al_2O_3 + ZrO_2$ | | | 12.5 | 12.5 | 12.5 | 12.1 | 12.5 |
| Crystallization Conditions | Nucleation Conditions | Temperature (° C.) | 600 | 600 | 600 | 600 | 600 |
| | | Retention time (h) | 5 | 5 | 5 | 5 | 5 |
| | Crystallization Conditions | Temperature (° C.) | 700 | 690 | 700 | 690 | 690 |
| | | Retention time (h) | 5 | 5 | 5 | 5 | 5 |
| Strengthening Conditions | First stage ($NaNO_3$) | Temperature (° C.) | 420 | 420 | 420 | 420 | 420 |
| | Strengthening | Retention time (h) | 4 | 4 | 4 | 4 | 4 |
| | Second stage ($KNO_3$) | Temperature (° C.) | 420 | 420 | 420 | 420 | 420 |
| | Strengthening | Retention time (h) | 2 | 2 | 2 | 2 | 2 |
| CS measurement Conditions | Measuring device | | FSM6000LE | FSM6000LE | FSM6000LE | FSM6000LE | FSM6000LE |
| | Measurement light source Wavelength (nm) | | 596 | 596 | 596 | 596 | 596 |
| | Refractive index n | | 1.528 | 1.538 | 1.539 | 1.541 | 1.535 |
| | Photoelastic constant (nm/cm/MPa) | | 30.3 | 31.2 | 31.2 | 31.2 | 31.2 |
| DOLzero Measurement conditions | Measuring device | | SLP-1000 | SLP-1000 | SLP-1000 | SLP-1000 | SLP-1000 |
| | Measurement light source Wavelength (nm) | | 640 | 640 | 640 | 640 | 640 |
| | Refractive index n | | 1.526 | 1.536 | 1.536 | 1.538 | 1.532 |
| | Photoelastic constant (nm/cm/MPa) | | 30.0 | 31.1 | 31.1 | 31.1 | 31.1 |
| CS(MPa) | | | 734 | 719 | 745 | 700 | 823 |
| DOLzero(μm) | | | 280 | 284 | 313 | 247 | 405 |

| Composition (mass %) | | | Ex. 6 | Ex. 7 | Ex. 8 | Ex. 9 | Ex. 10 |
|---|---|---|---|---|---|---|---|
| $SiO_2$ | | | 71.02 | 69.52 | 67.42 | 67.42 | 68.02 |
| $Li_2O$ | | | 7.00 | 7.00 | 7.00 | 7.00 | 7.40 |
| $Na_2O$ | | | | | | | |
| $K_2O$ | | | 1.50 | 1.50 | 1.50 | 1.50 | 1.50 |
| $Al_2O_3$ | | | 9.00 | 10.50 | 12.20 | 12.20 | 10.00 |
| $P_2O_5$ | | | 2.40 | 2.40 | 2.00 | 2.00 | 2.00 |
| MgO | | | 2.00 | 2.00 | 0.30 | 0.30 | 0.50 |
| CaO | | | | | | | |
| SrO | | | 0.50 | 0.50 | | | |
| BaO | | | 0.50 | 0.50 | | | |
| ZnO | | | 2.00 | 2.00 | 4.00 | 4.00 | 2.50 |
| $ZrO_2$ | | | 4.00 | 4.00 | 5.50 | 5.50 | 8.00 |
| $Nb_2O_5$ | | | | | | | |
| $TiO_2$ | | | | | | | |
| $Ta_2O_5$ | | | | | | | |
| $Sb_2O_3$ | | | 0.08 | 0.08 | 0.08 | 0.08 | 0.08 |
| Total | | | 100.0 | 100.0 | 100.0 | 100.0 | 100.0 |
| $Al_2O_3 + ZrO_2$ | | | 13.0 | 14.5 | 17.7 | 17.7 | 18.0 |
| Crystallization Conditions | Nucleation Conditions | Temperature (° C.) | 600 | 600 | 600 | 600 | 600 |
| | | Retention time (h) | 5 | 5 | 5 | 5 | 5 |
| | Crystallization Conditions | Temperature (° C.) | 690 | 690 | 690 | 705 | 690 |
| | | Retention time (h) | 5 | 5 | 5 | 5 | 5 |
| Strengthening Conditions | First stage ($NaNO_3$) | Temperature (° C.) | 420 | 420 | 420 | 420 | 420 |
| | Strengthening | Retention time (h) | 4 | 4 | 4 | 4 | 4 |
| | Second stage ($KNO_3$) | Temperature (° C.) | 420 | 420 | 420 | 400 | 420 |
| | Strengthening | Retention time (h) | 2 | 2 | 2 | 2 | 2 |

TABLE 1-continued

| | | | | | | |
|---|---|---|---|---|---|---|
| CS measurement Conditions | Measuring device | FSM6000LE | FSM6000LE | FSM6000LE | FSM6000LE | FSM6000LE |
| | Measurement light source Wavelength (nm) | 596 | 596 | 365 | 365 | 365 |
| | Refractive index n | 1.523 | 1.523 | 1.549 | 1.549 | 1.553 |
| | Photoelastic constant (nm/cm/MPa) | 29.2 | 29.2 | 34.0 | 34.0 | 34.0 |
| DOLzero Measurement conditions | Measuring device | SLP-1000 | SLP-1000 | SLP-1000 | SLP-1000 | SLP-1000 |
| | Measurement light source Wavelength (nm) | 640 | 640 | 640 | 640 | 640 |
| | Refractive index n | 1.520 | 1.520 | 1.526 | 1.526 | 1.532 |
| | Photoelastic constant (nm/cm/MPa) | 28.7 | 28.7 | 30.0 | 30.0 | 30.0 |
| CS(MPa) | | 760 | 803 | 910 | 904 | 920 |
| DOLzero(μm) | | 334 | 322 | 286 | 260 | 258 |

TABLE 2

| Composition (mass %) | | | Ex. 11 | Ex. 12 | Ex. 13 | Ex. 14 | Ex. 15 |
|---|---|---|---|---|---|---|---|
| $SiO_2$ | | | 67.82 | 68.92 | 66.42 | 66.42 | 66.11 |
| $Li_2O$ | | | 7.20 | 7.50 | 6.90 | 6.80 | 6.76 |
| $Na_2O$ | | | | | | | |
| $K_2O$ | | | 1.50 | 2.00 | 1.50 | 1.53 | 1.52 |
| $Al_2O_3$ | | | 10.50 | 10.50 | 11.80 | 11.01 | 11.43 |
| $P_2O_5$ | | | 2.00 | 2.00 | 5.00 | 6.70 | 6.67 |
| MgO | | | 0.40 | 1.00 | 0.30 | 0.29 | 0.29 |
| CaO | | | | | | | |
| SrO | | | | 2.00 | | | |
| BaO | | | | | | | |
| ZnO | | | 2.50 | | 3.00 | 2.39 | 2.38 |
| $ZrO_2$ | | | 8.00 | 6.00 | 5.00 | 4.79 | 4.76 |
| $Nb_2O_5$ | | | | | | | |
| $TiO_2$ | | | | | | | |
| $Ta_2O_5$ | | | | | | | |
| $Sb_2O_3$ | | | 0.08 | 0.08 | 0.08 | 0.08 | 0.08 |
| Total | | | 100.0 | 100.0 | 100.0 | 100.0 | 100.0 |
| $Al_2O_3 + ZrO_2$ | | | 18.5 | 16.5 | 16.8 | 15.8 | 16.2 |
| Crystallization Conditions | Nucleation Conditions | Temperature (° C.) | 600 | 600 | 600 | 600 | 600 |
| | | Retention time (h) | 5 | 5 | 5 | 5 | 5 |
| | Crystallization Conditions | Temperature (° C.) | 690 | 675 | 720 | 720 | 720 |
| | | Retention time (h) | 5 | 5 | 5 | 5 | 5 |
| Strengthening Conditions | First stage ($NaNO_3$) | Temperature (° C.) | 420 | 420 | 420 | 420 | 420 |
| | Strengthening conditions | Retention time (h) | 4 | 4 | 4 | 4 | 4 |
| | Second stage ($KNO_3$) | Temperature (° C.) | 420 | 420 | 420 | 420 | 420 |
| | Strengthening conditions | Retention time (h) | 2 | 5 | 4 | 4 | 4 |
| CS measurement Conditions | Measuring device | | FSM6000LE | FSM6000LE | FSM6000LE | FSM6000LE | FSM6000LE |
| | Measurement light source Wavelength (nm) | | 365 | 365 | 596 | 596 | 596 |
| | Refractive index n | | 1.553 | 1.547 | 1.521 | 1.516 | 1.514 |
| | Photoelastic constant (nm/cm/MPa) | | 34.0 | 34.0 | 30.3 | 30.3 | 30.3 |
| DOLzero Measurement conditions | Measuring device | | SLP-1000 | SLP-1000 | SLP-1000 | SLP-1000 | SLP-1000 |
| | Measurement light source Wavelength (nm) | | 640 | 640 | 640 | 640 | 640 |
| | Refractive index n | | 1.532 | 1.525 | 1.519 | 1.513 | 1.511 |
| | Photoelastic constant (nm/cm/MPa) | | 30.0 | 30.0 | 30.0 | 30.0 | 30.0 |
| CS(MPa) | | | 939 | 710 | 833 | 728 | 686 |
| DOLzero(μm) | | | 262 | 267 | >500 | >500 | >500 |

| Composition (mass %) | Ex. 16 | Ex. 17 | Ex. 18 | Ex. 19 | Ex. 20 |
|---|---|---|---|---|---|
| $SiO_2$ | 66.70 | 66.10 | 66.75 | 65.66 | 65.92 |
| $Li_2O$ | 6.20 | 7.20 | 6.93 | 7.14 | 7.00 |
| $Na_2O$ | | | | | |
| $K_2O$ | 1.90 | 1.50 | 1.48 | 1.53 | 1.50 |
| $Al_2O_3$ | 8.10 | 12.50 | 12.08 | 12.44 | 12.20 |
| $P_2O_5$ | 2.00 | 2.10 | 1.98 | 2.04 | 2.00 |

TABLE 2-continued

|  |  |  |  |  |  |  |  |
|---|---|---|---|---|---|---|---|
| MgO |  |  | 2.00 | 0.82 | 0.30 | 1.02 | 0.80 |
| CaO |  |  |  |  | 0.99 | 0.41 | 1.00 |
| SrO |  |  | 1.70 |  |  |  |  |
| BaO |  |  | 2.50 |  |  |  |  |
| ZnO |  |  | 6.00 | 4.10 | 3.96 | 4.08 | 4.00 |
| $ZrO_2$ |  |  | 2.40 | 5.60 | 5.45 | 5.60 | 5.50 |
| $Nb_2O_5$ |  |  |  |  |  |  |  |
| $TiO_2$ |  |  |  |  |  |  |  |
| $Ta_2O_5$ |  |  |  |  |  |  |  |
| $Sb_2O_3$ |  |  | 0.50 | 0.08 | 0.08 | 0.08 | 0.08 |
| Total |  |  | 100.0 | 100.0 | 100.0 | 100.0 | 100.0 |
| $Al_2O_3 + ZrO_2$ |  |  | 10.5 | 18.1 | 17.5 | 18.0 | 17.7 |
| Crystallization Conditions | Nucleation Conditions | Temperature (° C.) | 600 | 600 | 600 | 600 | 600 |
|  |  | Retention time (h) | 5 | 5 | 5 | 5 | 5 |
|  | Crystallization Conditions | Temperature (° C.) | 690 | 700 | 690 | 700 | 700 |
|  |  | Retention time (h) | 5 | 5 | 5 | 5 | 5 |
| Strengthening Conditions | First stage ($NaNO_3$) | Temperature (° C.) | 420 | 420 | 420 | 400 | 400 |
|  | Strengthening conditions | Retention time (h) | 4 | 6 | 6 | 2.5 | 2.5 |
|  | Second stage ($KNO_3$) | Temperature (° C.) | 420 | 400 | 400 | 390 | 390 |
|  | Strengthening conditions | Retention time (h) | 4 | 2 | 2 | 3 | 3 |
| CS measurement Conditions | Measuring device |  | FSM6000LE | FSM6000LE | FSM6000LE | FSM6000LE | FSM6000LE |
|  | Measurement light source Wavelength (nm) |  | 596 | 596 | 596 | 596 | 596 |
|  | Refractive index n |  | 1.528 | 1.531 | 1.532 | 1.533 | 1.533 |
|  | Photoelastic constant (nm/cm/MPa) |  | 30.3 | 30.3 | 30.3 | 29.6 | 29.6 |
| DOLzero Measurement conditions | Measuring device |  | SLP-1000 | SLP-1000 | SLP-1000 | SLP-1000 | SLP-1000 |
|  | Measurement light source Wavelength (nm) |  | 640 | 640 | 640 | 640 | 640 |
|  | Refractive index n |  | 1.525 | 1.529 | 1.529 | 1.530 | 1.530 |
|  | Photoelastic constant (nm/cm/MPa) |  | 30.0 | 30.0 | 30.0 | 29.2 | 29.2 |
| CS(MPa) |  |  | 700 | 853 | 881 | 860 | 926 |
| DOLzero(μm) |  |  | 221 | 323 | 306 | 283 | 275 |

TABLE 3

| Composition (mass %) |  |  | Ex. 21 | Ex. 22 | Ex. 23 | Ex. 24 | Ex. 25 |
|---|---|---|---|---|---|---|---|
| $SiO_2$ |  |  | 64.20 | 65.47 | 65.58 | 65.72 | 61.62 |
| $Li_2O$ |  |  | 6.97 | 7.42 | 7.24 | 7.28 | 6.30 |
| $Na_2O$ |  |  |  |  |  |  |  |
| $K_2O$ |  |  | 1.50 | 1.52 | 1.55 | 1.50 | 1.50 |
| $Al_2O_3$ |  |  | 12.10 | 12.40 | 12.62 | 12.16 | 6.70 |
| $P_2O_5$ |  |  | 2.60 | 2.03 | 2.07 | 1.99 | 2.70 |
| MgO |  |  | 1.10 | 1.02 | 1.03 | 0.80 |  |
| CaO |  |  | 1.25 | 0.40 |  | 1.00 |  |
| SrO |  |  |  |  |  |  |  |
| BaO |  |  |  |  |  |  | 2.60 |
| ZnO |  |  | 4.60 | 4.07 | 4.14 | 3.99 | 4.50 |
| $ZrO_2$ |  |  | 5.60 | 5.59 | 5.69 | 5.48 | 5.50 |
| $Nb_2O_5$ |  |  |  |  |  |  | 2.50 |
| $TiO_2$ |  |  |  |  |  |  |  |
| $Ta_2O_5$ |  |  |  |  |  |  | 6.00 |
| $Sb_2O_3$ |  |  | 0.08 | 0.08 | 0.08 | 0.08 | 0.08 |
| Total |  |  | 100.0 | 100.0 | 100.0 | 100.0 | 100.0 |
| $Al_2O_3 + ZrO_2$ |  |  | 17.7 | 18.0 | 18.3 | 17.6 | 12.2 |
| Crystallization Conditions | Nucleation Conditions | Temperature (° C.) | 600 | 600 | 600 | 600 | — |
|  |  | Retention time (h) | 5 | 5 | 5 | 5 | — |
|  | Crystallization Conditions | Temperature (° C.) | 700 | 700 | 720 | 700 | 720 |
|  |  | Retention time (h) | 5 | 5 | 5 | 5 | 5 |
| Strengthening Conditions | First stage ($NaNO_3$) | Temperature (° C.) | 400 | 400 | 400 | — | 420 |

TABLE 3-continued

| | | | | | | | |
|---|---|---|---|---|---|---|---|
| | Strengthening conditions | Retention time (h) | 2.5 | 4 | 4 | — | 4 |
| | Second stage (KNO$_3$) Strengthening | Temperature (° C.) | 390 | 400 | 400 | 380 | 380 |
| | | Retention time (h) | 3 | 2 | 2 | 5 | 3 |
| CS measurement Conditions | Measuring device | | FSM6000LE | FSM6000LE | FSM6000LE | FSM6000LE | FSM6000LE |
| | Measurement light source Wavelength (nm) | | 596 | 596 | 596 | 596 | 365 |
| | Refractive index n | | 1.536 | 1.535 | 1.533 | 1.533 | 1.576 |
| | Photoelastic constant (nm/cm/MPa) | | 29.6 | 30.3 | 30.3 | 30.3 | 34.0 |
| DOLzero Measurement conditions | Measuring device | | SLP-1000 | SLP-1000 | SLP-1000 | FSM6000LE | SLP-1000 |
| | Measurement light source Wavelength (nm) | | 640 | 640 | 640 | 596 | 640 |
| | Refractive index n | | 1.533 | 1.532 | 1.530 | 1.533 | 1.552 |
| | Photoelastic constant (nm/cm/MPa) | | 29.2 | 30.0 | 30.0 | 30.3 | 31.1 |
| CS(MPa) | | | 958 | 895 | 893 | 1008 | 869 |
| DOLzero(μm) | | | 257 | 235 | 176 | 4 | 184 |

| | Composition (mass %) | | Ex. 26 | Ex. 27 | Ex. 28 | Com. Ex. 1 | Com. Ex. 2 |
|---|---|---|---|---|---|---|---|
| | SiO$_2$ | | 67.42 | 68.00 | 67.42 | 67.30 | 69.50 |
| | Li$_2$O | | 7.00 | 7.00 | 7.00 | 6.20 | 7.00 |
| | Na$_2$O | | | | | | |
| | K$_2$O | | 1.00 | 0.50 | 1.00 | 2.00 | 2.00 |
| | Al$_2$O$_3$ | | 12.20 | 13.80 | 12.20 | 7.40 | 7.00 |
| | P$_2$O$_5$ | | 2.00 | 2.50 | 2.00 | 2.00 | 2.20 |
| | MgO | | 0.30 | 0.50 | 0.30 | 2.00 | 1.70 |
| | CaO | | | | | | |
| | SrO | | | | | 1.70 | 1.00 |
| | BaO | | | | | 2.50 | 1.60 |
| | ZnO | | 3.00 | 2.52 | 3.00 | 6.00 | 2.80 |
| | ZrO$_2$ | | 7.00 | 5.10 | 7.00 | 2.40 | 2.00 |
| | Nb$_2$O$_5$ | | | | | | |
| | TiO$_2$ | | | | | | 3.00 |
| | Ta$_2$O$_5$ | | | | | | |
| | Sb$_2$O$_3$ | | 0.08 | 0.08 | 0.08 | 0.50 | 0.20 |
| | Total | | 100.0 | 100.0 | 100.0 | 100.0 | 100.0 |
| | Al$_2$O$_3$ + ZrO$_2$ | | 19.2 | 18.9 | 19.2 | 9.8 | 9.0 |
| Crystallization Conditions | Nucleation Conditions | Temperature (° C.) | — | — | — | 600 | 600 |
| | | Retention time (h) | — | — | — | 5 | 5 |
| | Crystallization Conditions | Temperature (° C.) | 720 | 720 | 720 | 690 | 670 |
| | | Retention time (h) | 5 | 5 | 5 | 5 | 5 |
| Strengthening Conditions | First stage (NaNO$_3$) | Temperature (° C.) | 420 | 420 | 420 | — | — |
| | Strengthening conditions | Retention time (h) | 4 | 1 | 1 | — | — |
| | Second stage (KNO$_3$) | Temperature (° C.) | 380 | — | — | 450 | 450 |
| | Strengthening | Retention time (h) | 3 | — | — | 12 | 12 |
| CS measurement Conditions | Measuring device | | FSM6000LE | SLP-1000 | SLP-1000 | FSM6000LE | FSM6000LE |
| | Measurement light source Wavelength (nm) | | 596 | 640 | 640 | 596 | 596 |
| | Refractive index n | | 1.533 | 1.524 | 1.531 | 1.530 | 1.534 |
| | Photoelastic constant (nm/cm/MPa) | | 29.6 | 29.2 | 29.2 | 30.3 | 30.3 |
| DOLzero Measurement conditions | Measuring device | | SLP-1000 | SLP-1000 | SLP-1000 | FSM6000LE | FSM6000LE |
| | Measurement light source Wavelength (nm) | | 640 | 640 | 640 | 596 | 596 |
| | Refractive index n | | 1.531 | 1.524 | 1.531 | 1.530 | 1.534 |
| | Photoelastic constant (nm/cm/MPa) | | 29.2 | 29.2 | 29.2 | 30.3 | 30.3 |
| CS(MPa) | | | 1002 | 628 | 646 | 573 | 529 |
| DOLzero(μm) | | | 261 | 112 | 114 | 24 | 26 |

Although some embodiments and/or examples of the present disclosure are described above in detail, those skilled in the art may easily apply many modifications to these exemplary embodiments and/or examples without substantial departure from the novel teachings and effects of the present disclosure. Therefore, these modifications are within the scope of the present disclosure.

All the contents of the literature described in the specification are incorporated herein.

What is claimed is:

1. An inorganic composition article containing at least one kind selected from α-cristobalite and α-cristobalite solid solution as a main crystal phase, wherein
by mass % in terms of oxide,
a content of a $SiO_2$ component is 50.0% to 75.0%,
a content of a $Li_2O$ component is 3.0% to 10.0%,
a content of an $Al_2O_3$ component is 5.0% or more and less than 15.0%, and
a total content of the $Al_2O_3$ component and a $ZrO_2$ component is more than 16.2%, and
a surface compressive stress value is 600 MPa or more.

2. The inorganic composition article according to claim 1, wherein by mass % in terms of oxide,
a content of a $ZrO_2$ component is 1.2% to 10.0% or less,
a content of a $K_2O$ component is 0% to 10.0%, and
a content of a $P_2O_5$ component is 0% to 10.0%.

3. The inorganic composition article according to claim 1, wherein by mass % in terms of oxide,
a content of a $Na_2O$ component is 0% to 10.0%,
a content of a MgO component is 0% to 10.0%,
a content of a CaO component is 0% to 10.0%,
a content of a SrO component is 0% to 10.0%,
a content of a BaO component is 0% to 10.0%,
a content of a ZnO component is 0% to 10.0%, and
a content of a $Sb_2O_3$ component is 0% to 3.0%.

4. The inorganic composition article according to claim 1, wherein by mass % in terms of oxide,
a content of a $Nb_2O_5$ component is 0% to 10.0%,
a content of a $Ta_2O_5$ component is 0% to 10.0%, and
a content of a $TiO_2$ component is 0% or more and less than 7.0%.

5. The inorganic composition article according to claim 1, wherein the total content of the $Al_2O_3$ component and the $ZrO_2$ component is less than 18.3%.

6. The inorganic composition article according to claim 1, wherein the surface compressive stress value is 680 MPa or more.

7. The inorganic composition article according to claim 1, wherein the surface compressive stress value is 700 MPa or more.

* * * * *